United States Patent [19]
Lee

[11] 3,959,912
[45] June 1, 1976

[54] FISHING LURE

[75] Inventor: David C. Lee, Hot Springs, Ark.

[73] Assignee: Charles D. Morehead, Paducah, Ky.

[22] Filed: Aug. 20, 1975

[21] Appl. No.: 606,096

[52] U.S. Cl. .............................. 43/42.02; 43/42.1; 43/42.28; 43/42.37
[51] Int. Cl.² ........................................ A01K 85/00
[58] Field of Search ............ 43/42.28, 42.24, 42.02, 43/42.1, 42.37

[56] References Cited
UNITED STATES PATENTS

| | | | |
|---|---|---|---|
| 2,268,541 | 1/1942 | Arbogast | 43/42.28 X |
| 2,686,382 | 8/1954 | Fisher | 43/42.28 |
| 3,060,620 | 10/1962 | Binkowski | 43/42.24 |
| 3,861,073 | 1/1975 | Thomassin | 43/42.1 |

Primary Examiner—Louis G. Mancene
Assistant Examiner—Daniel J. Leach
Attorney, Agent, or Firm—Lowe, King, Price & Markva

[57] ABSTRACT

An artificial fishing lure which simulates the vacillatory movement of natural bait comprises a pliable plastic cylindrically shaped central body along the axis of which a fishing hook may be forcibly inserted. Extending somewhat radially from the central body is a skirt which comprises a plurality of individual elongated plastic members to the ends of which are, in turn, integrally attached a plurality of tail elements. Each of the skirt members and the tail elements is formed of a soft, pliable plastic. The tail element is shaped as a flattened curl which, in repose, lies in a single plane on one side of the skirt member. Upon extension of the curl, such as occurs when the lure is pulled through water, a lateral, reverse twist forms, and the tail vacillates and gyrates simulating natural bait movement.

7 Claims, 7 Drawing Figures

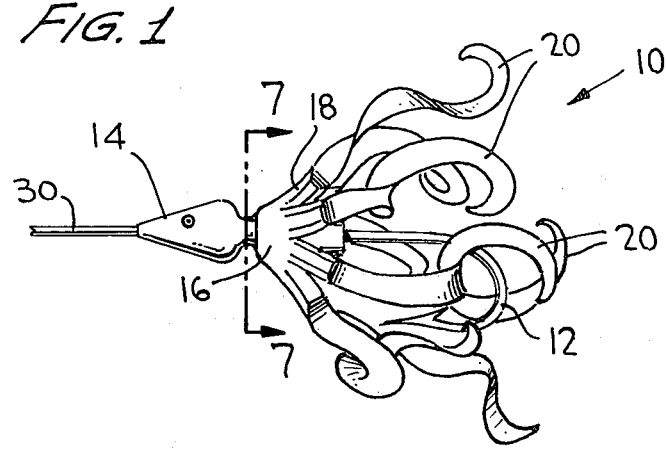
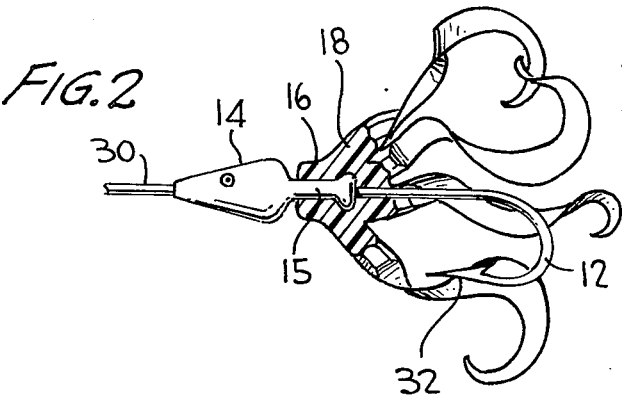
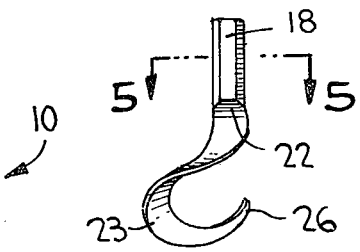
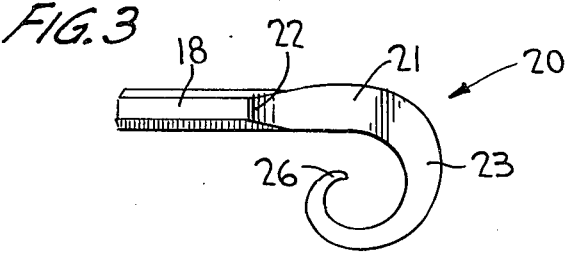
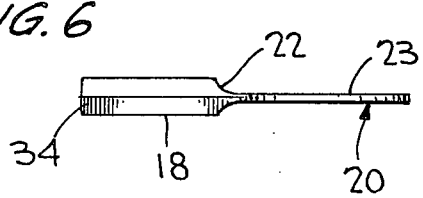
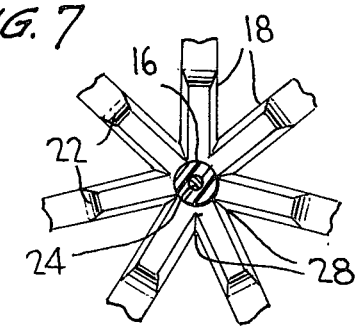

FISHING LURE

BACKGROUND OF THE INVENTION

1. Field of the Invention

The present invention is related to fishing lures and, more particularly, to an artificial fishing lure skirt configured to provide life-like undulations and gyrations when drawn through water.

2. Description of the Prior Art

Currently in wide use are many different types of fishing lures and baits; some of the more common ones being known as spinner-baits, jigs, and plugs. Spinner-baits, for example, basically consist of a hook-lead-wire-blade combination to which a vinyl plastic or rubber skirt may be attached. Such skirts, intended as lure enhancements, have essentially straight, thin tails and unfortunately provide very little movement or undulations as the spinner-baits are drawn through the water. There would appear to be a need for a skirt for spinner-baits and the like which can impart more life-like action to lure fish.

Many attempts have been advanced in the prior art to provide a more life-like lure to fishermen, as exemplified by U.S. Pat. Nos. 1,851,529; 2,111,020; 2,268,541; 3,158,952; and 3,861,073. While each of the inventors of the lures described in these patents claims outstanding results and superior performance, none of the lures, to my knowledge, have found wide acceptance in the marketplace as either a skirt attachment for spinner-baits or the like, or as a lure in and of themselves. One can therefore safely assume that the results of their use proved somewhat less than satisfactory.

OBJECTS AND SUMMARY OF THE INVENTION

It is therefore a primary object of the present invention to provide an effective and life-like lure for use with spinner-baits, jigs, plugs, and the like, which is inexpensive, easily manufactured, adaptable to a variety of uses, and which provides results superior to presently utilized lures.

Another object of the present invention is to provide an artificial fishing lure which is comprised of a highly flexible and pliable soft elastomeric plastic so as to provide life-like undulations and gyrations when pulled through the water.

An additional object of the present invention is to provide a multi-tailed fishing lure designed in such a manner that passage through the water thereof will impart life-like action to each tail thereof and thereby provide a highly effective and efficient lure.

The foregoing and other objects are achieved in accordance with one aspect of the present invention through the provision of an artificial fishing lure for attachment to a fish hook which comprises a pliable plastic central body and a pliable plastic skirt means extending outwardly from the central body with a plurality of soft, thin flexible plastic tails integrally formed thereon.

The skirt means preferably comprises a plurality of pliable, elongated plastic skirt members each of which is attached at one end thereof to the central body. The distal end of each of the plastic skirt members has a flexible plastic tail integrally attached thereto. The flexible plastic tails are characterized as substantially flat elements which, in repose, are curled in a single plane. The skirt elements are substantially thicker than the tail elements, the junction thereof being defined by a gradually tapered portion.

In accordance with other aspects of the present invention, the central body comprises a substantially cylindrically shaped member having a longitudinal axis through which a fish hook may be forcibly drawn. In repose, the plane of each curled flat tail element lies on one side of the longitudinal axis of its skirt element. When the lure is pulled through the water causing a flow along said axis, such as occurs when the lure is in use, a lateral, reverse twist occurs in the flat portion of the tail element switching the free end of the tail element to the opposite side causing a fish-attracting vacillatory movement thereof.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which:

FIG. 1 is a side view illustrating a preferred embodiment of the hook and lure combination in accordance with the present invention;

FIG. 2 is a side-sectional view of the embodiment seen in FIG. 1;

FIG. 3 is a plan view of a preferred embodiment of a single skirt and tail member while in repose;

FIG. 4 is a side view of the skirt and tail member of FIG. 3 when extended;

FIG. 5 is a top view of the skirt and tail element shown in FIG. 4 and taken along line 5—5 thereof;

FIG. 6 is a side view of the skirt and tail element shown in FIG. 3; and

FIG. 7 is a top view of the lure shown in FIG. 1 taken along line 7—7 thereof but with the twisted tail members cut away for clarity of the showing of the skirt members.

DETAILED DESCRIPTION OF A PREFERRED EMBODIMENT

Referring now to the drawings and particularly to FIGS. 1 and 2, a preferred embodiment of the fishing lure of the present invention is designated generally by the reference numeral 10 and comprises a central body 16 having a substantially cylindrical shape. Positionable along the axis of cylindrical body 16 is a reduced diameter portion 15 of a lure head 14, which may have an eye or other enticing markings. Extending from the reduced diameter portion 15 is a conventional hook 12 which terminates in a forwardly projecting barbed point 32. Extending through the head 14 is the shank 30 of hook 12.

Since the central cylindrical body 16 is preferably comprised of a soft, highly pliable elastomeric plastic, it is not necessary to provide a hole or aperture preformed therein to receive hook 12. Rather, the barbed point 32 may be manually forced through the center 24 of body 16 with very little effort, the resulting hole being sufficiently supple and elastic so as to easily encompass reduced diameter portion 15 of head 14 with enough friction so as to remain in position thereabout.

As best viewed in FIG. 7, extending somewhat radially outwardly from central body 16 are a plurality of skirt members 18. Skirt members 18 are integrally formed with central body 16 and are therefore composed of the same soft pliable plastic. Skirt members 18 are freely flexible at the point of attachment to central body 16 and, at their other ends, terminate in tapered portions 22 (FIGS. 3 and 6). Skirt members 18 are disposed in a spoke-like fashion about central body 16 so as to permit and facilitate the passage of water around and through the lure. The number of skirt elements 18 provided about body 16 is not critical, although seven have been shown in this embodiment as exemplary.

Integrally extending from the tapered portion 22 of each of the skirt elements 18 is a soft plastic tail 20. As seen in FIG. 3, each tail element 20 is curled from the connected end 21 to the free end 26. It can also be appreciated from FIG. 3 that the tail 20, in addition to being curled, is also tapered in width.

As perhaps best viewed in FIGS. 3 and 6, the curled tail element 20 is formed as a flattened element which, in repose, lies in a single plane on one side of the skirt element 18. The thickness of the tail element 20 is substantially less than that of its attached skirt element 18, a gradually tapered portion 22 being preferably provided at the junction therebetween.

It may be appreciated by viewing FIGS. 3 and 7 that the flattened surface 23 of each tail element 20 in repose lies transverse to the longitudinal axis of central body 16 through which the shank 30 of hook 12 is fitted. Thus, when the hook and line are in motion through the water, the surfaces 23 of tail portions 20 will be transversely disposed to the direction of movement of fluid past the hook and lure so as to present something of a resistance thereto. This resistance, coupled with the curved and tapered design of the tail elements 20, provides vacillatory gyrations of the tail elements to an extent heretofore unrealized by prior art lures. Each curled tail element 20 is given a life-like action by the free end 26 switching back and forth from one side to the other, as will be more clearly seen in the discussion below. These oscillatory undulating movements are enhanced by the thinness of the tail elements 20, as well as by the pliant plastic from which they are composed, which may, for example, constitute highly plasticized polyvinylchloride.

The extremely active and life-like movements of tail elements 20, and consequent attractiveness to fish, are better appreciated with the aid of FIGS. 4 and 5 which show side and top views of one of the tail elements simply hanging in a vertical orientation, under the influence only of gravity. From FIGS. 4 and 5 it can be appreciated that tail element 20, when gravitationally extended reacts essentially like it would when influenced by fluid flow. The tail forms a lateral, reverse twist or spiral. Looking down from above (FIG. 5), the axis of skirt element 18 lies approximately at the center of the twisted curl. The free end of the tail element 20 has shifted to the opposite side of the skirt element, thus forming the lateral, reverse twist. This spiral twist is manifested in the intermediate section 23 of tail element 20 moving along side of the axis of the skirt element 18. The twist of the tail sets up increased resistance and stretching. As the elastic limit is approached, the tail tends to spring back toward the original or repose position, and as a consequence the desired fluttering movement of each tail 20 occurs as the lure is pulled through the water.

It should also be appreciated that the movement of the plurality of tail elements 20 of the preferred embodiment of the present invention is completely random and unpredictable as illustrated in FIG. 1. This random, but acute spring-like, motion further approximates life-like activity so as to enhance the attractiveness of the lure. It will be appreciated by a person skilled in the art that the preferred embodiment described above may be utilized in conjunction with spinner-baits, jigs, plugs and as a lure by itself. The lure 10 of the present invention may be readily fabricated in a variety of sizes, and, being extremely pliable, is easily stored and quite durable. In operation, the hook 12 is quite well camouflaged and protected from hanging-up on weeds by the emcompassing tail elements 20.

Obviously, numerous modifications and variations of the present invention are possible in light of the above teachings. It is therefore to be understood that within the scope of the appended claims the invention may be practiced otherwise than as specifically described herein.

What is claimed is:

1. A lure for attachment to a fish hook, which comprises a pliable plastic central body, a pliable plastic skirt means extending outwardly from said central body, and a plurality of soft thin flexible plastic tails extending integrally from said skirt means, each of said flexible plastic tails comprising a substantially flat element having a connecting end and a free end, said connecting end being attached integrally to said skirt means, said flat element in repose being curled in a plane from its connecting end to said free end, said skirt means comprising a plurality of pliable plastic skirt members each of which is attached at one end thereof to said central body and at the other end thereof to said connecting end of one of said flat tail elements, and each of said skirt members being substantially thicker than said tail elements, and wherein said other end of said skirt member includes a portion tapered to terminate in said connecting end of said tail element.

2. The lure as set forth in claim 1 wherein said central body comprises a substantially cylindrically shaped member the longitudinal axis of which is adapted to receive said fish hook.

3. A lure for attachment to a fish hook, which comprises a pliable plastic central body, a pliable plastic skirt means extending outwardly from said central body, and a plurality of soft thin flexible plastic tails extending integrally from said skirt means, each of said flexible plastic tails comprising a substantially flat element having a connecting end and a free end, said connecting end being attached integrally to said skirt means, said flat element in repose being curled in a plane from its connecting end to said free end, said skirt means comprising a plurality of pliable plastic skirt members each of which is attached at one end thereof to said central body and at the other end thereof to said connecting end of one of said flat tail elements, and each of said curled flat elements, when extended, forming a reverse twist to switch the free end to the opposite side of the skirt member.

4. The lure as set forth in claim 3, wherein each of said curled flat tail elements is tapered in width from its head end to its tail end.

5. The lure as set forth in claim 3 wherein is further provided in combination additional fish enticing means connected to said lure.

6. The lure as set forth in claim 5 wherein said enticing means includes at least a lure head positioned forward of said body.

7. The lure as set forth in claim 3 wherein is further provided in combination said hook with a shank portion passing through said body.

* * * * *